July 3, 1962  A. DELPOUX  3,042,921
APPARATUS FOR RECORDING MAXIMUM VALUES OF A VARIABLE QUANTITY
Filed Dec. 19, 1960  4 Sheets-Sheet 1

INVENTOR:
Albert Delpoux
By: George H. Spencer
Attorney

July 3, 1962  A. DELPOUX  3,042,921
APPARATUS FOR RECORDING MAXIMUM VALUES OF A VARIABLE QUANTITY
Filed Dec. 19, 1960  4 Sheets-Sheet 2

INVENTOR:
Albert Delpoux
By: George H. Spencer
Attorney

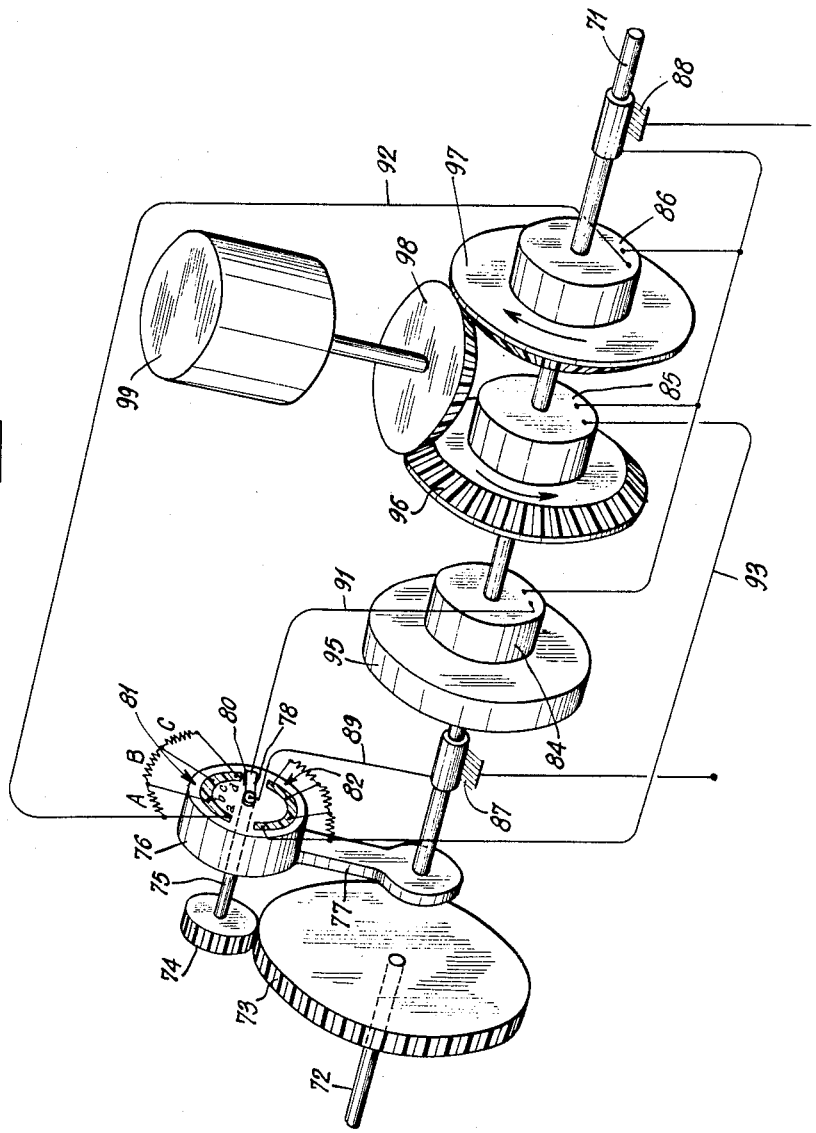

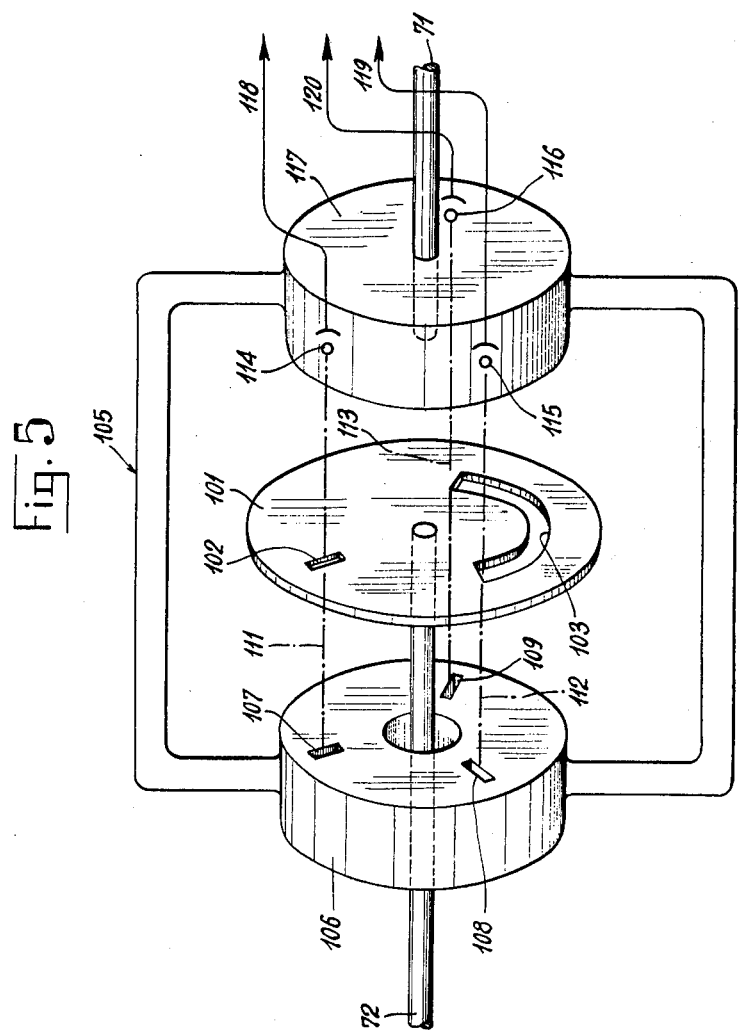

United States Patent Office 3,042,921
Patented July 3, 1962

3,042,921
APPARATUS FOR RECORDING MAXIMUM
VALUES OF A VARIABLE QUANTITY
Albert Delpoux, Paris, France, assignor to Electricite de
France (Service National), a French national service
Filed Dec. 19, 1960, Ser. No. 76,664
Claims priority, application France Dec. 30, 1959
16 Claims. (Cl. 346—30)

The present invention relates to an apparatus for recording the maximum values of a variable occurring over a predetermined testing period.

There are various occasions on which it is of advantage to record such maximum values during the duration of the test period which may vary according to the particular circumstances, such as the hourly or daily maximum, etc. The variable tested may be a physical measurement (temperature, height, etc.) or a factor standard which itself has already been more or less worked out or it may be the result of the comparison of other variables or factors. Thus in a sphere of practical application to which the present invention particularly relates, for example in the field of the distribution of energy, the variable tested will be the movable average of power absorbed by a network or by a consumer.

According to the present invention a recording apparatus comprises an input wheel capable at any given time of angular movement proportional to the value of the variable under test, a transfer wheel, a connecting wheel, an output wheel, two resilient and two positive transmission devices for transmitting the movements of the first three said wheels, a third positive transmission device for transmitting to the output wheel a movement of the connecting wheel representative of an ascending value of said variable thereat, a device for recording the position of the output wheel at predetermined time intervals, means to block movement of the transfer wheel during each said recording, and a device for driving the output wheel in a direction representative of a descending value of said variable thereat and operable after each said recording to drive the output wheel in a direction representative of a descending value of the variable on the connecting wheel until the third positive transmission device re-establishes a connection between the output and connecting wheels if such connection was previously interrupted, as will be described below.

Such an apparatus ensures the completely automatic recording of the maximum values which have been attained during testing periods measured over each period of operation of the recording device. The resilient transmission devices ensure that any movement which is retained temporarily owing to the stoppage of the output wheel during each recording period, is stored in memory.

A servo-motor may be drivingly connected to the driving shaft of the input wheel to drive said wheel in one or other of two angular directions and responsive to an angular movement detecting device capable of detecting such movement between two reference points operatively connected one to the said input wheel shaft and the other to the shaft of said output wheel.

From another aspect the invention includes a registering apparatus for registering the maximum value of a varying mean of a force, said registering apparatus comprising a recording apparatus as herein set forth, a differential device the angular position of the output shaft of which is representative of the said mean of the force, and a train of gears coupling the said differential output shaft to the input shaft of said recording apparatus.

To enable the invention to be more clearly understood some embodiments in accordance therewith will now be described by way of example with reference to the accompanying drawings in which:

FIGURE 4 is a perspective diagrammatic view of an apparatus for driving the input wheel shaft of the recording apparatus; and, FIGURE 5 is a perspective diagrammatic view of another apparatus for driving the input wheel shaft of the recording apparatus.

Figure 1:
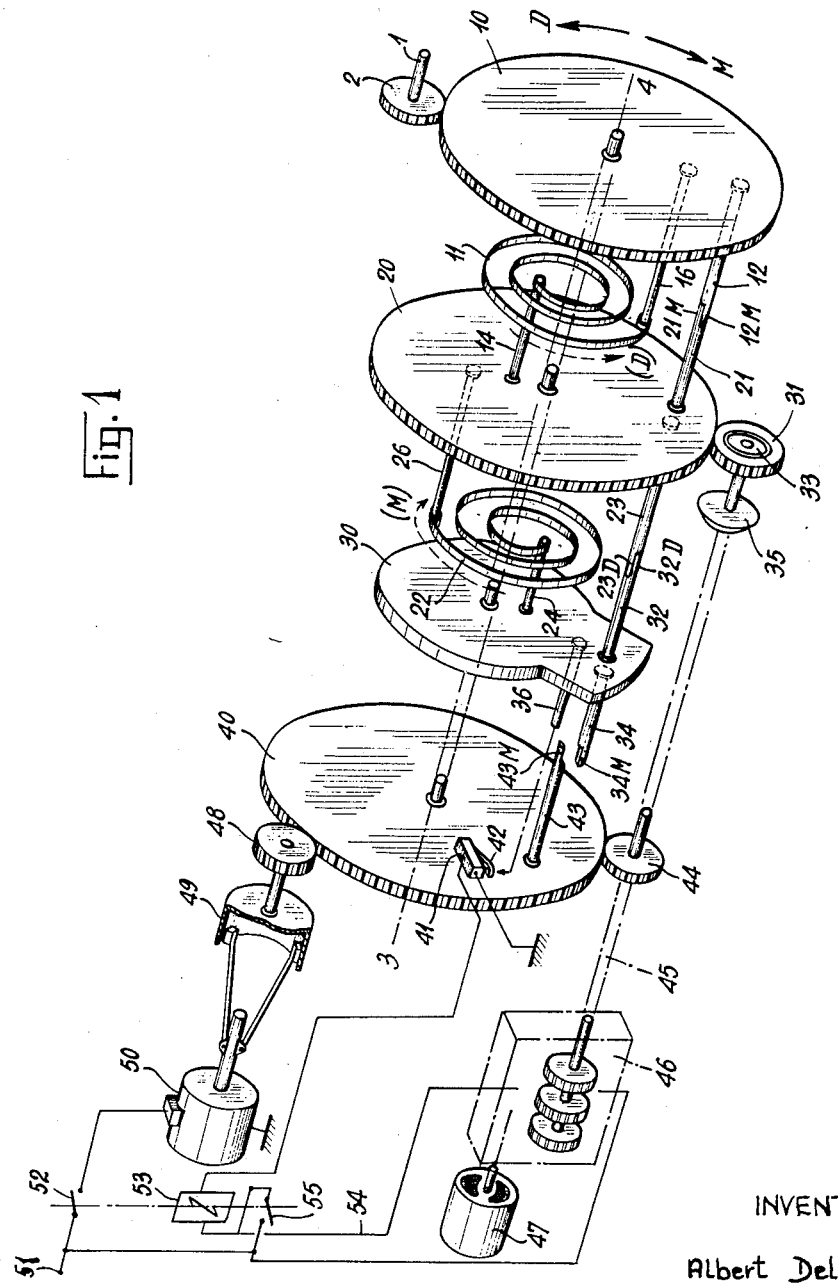
FIGURE 1 is an exploded perspective diagrammatic view of a recording apparatus.

Referring to FIGURE 1, the value of a variable tested is constantly represented by the angular position of a shaft 1 which drives through a cog 2, a toothed input wheel 10 of a recording apparatus. The variable tested, being presumed to be liable to vary between zero and a certain maximum figure, the diameter of the wheel 10 and the reduction ratio of the movement, are selected so as to ensure that the variation of the variable tested between zero and its maximum value corresponds to a rotation of the wheel of less than 360°. The value of the variable tested is therefore represented always by the angular position of any selected point of the entrance wheel 10 in relation to a given starting position; this chosen position will, for example, be established herein by an arm 12 which moves in a clockwise direction (shown by the arrow M) when the variable increases or ascends and in the reverse direction (shown by the arrow D) when the amount decreases or descends.

The apparatus comprises two other wheels called the transfer wheel 20 and the output wheel 40, mounted on a joint axle 3—4, besides wheel 10, of similar design and able to rotate, as well as a connecting wheel 30 between the wheels 20 and 40. Whereas the wheels 10, 20 and 30 rotate freely on their joint axle, a resistant torque opposes the rotation of the wheel 40 for reasons to be described and in FIGURE 1 this resistant torque is produced by mounting the wheel 40 so that it can rub lightly on the axle 3—4.

All the wheels may be made from light material, nylon for instance, in order to reduce their inertia.

Two means for transmitting movement from the input wheel 10 to the transfer wheel 20 are provided:

The first means comprises an arm 12 carried by the wheel 10, and an arm 21 on a corresponding radius and carried by the wheel 20. These arms have facing thrust-bearing surfaces 12M and 21M respectively and are so disposed that in ascending movement of the wheel 10, the arm 12 moves the arm 21, while in the descending direction the thrust bearing surface 12M move away from the thrust bearing surface 21M.

The second of said means, by which the wheel 10 is coupled to the wheel 20, comprises a spiral spring 11, which winds anti-clockwise from an attaching lever or arm 14, attached at a point on the face of the wheel 20 which is directed toward the wheel 10, and extending to a lever 16 connected to a point on the face of the wheel 10 which is directed toward the wheel 20, the attachment point of the lever 16 on the wheel 10 being radially outwardly with respect to the attachment point of the lever 14 on the wheel 20. When the wheel 10 descends it winds up the spring 11 which transfers its motion to the transfer wheel 20 through the lever 14; this motion transfer is only possible, however, on condition that the wheel 20 is free to follow. When, for any reason, the wheel 20 remains obstructed, the lever 16 follows the descending movement of the wheel 10 alone, while pulling on the spring 11; when the wheel 20 is freed from its obstruction, the spring 11 unwinds and, by yielding its stored energy, moves the wheel 20.

In other words, it will be seen that the levers 12—21 provide a positive means of transmitting the ascending movements while the spring 11 forms a means of transmitting the descending movements, being capable of storing in memory such movements during periods when, by reason of the obstruction of the wheel 20, this transmission is prevented.

Between the transfer wheel 20 and the connecting wheel 30, similar positive means of transmission are disposed, formed by a pair of levers 23, 32 respectively, the thrust-bearing surfaces of which, 23D, 32D are so directed as to ensure transmission of only the descending movements; a means of transmitting the ascending movements is provided, on the other hand, by a spiral spring 22 which winds up in a clockwise direction between a radially interior lever 24 connected to the wheel 30 and a radially exterior lever 26 which is connected to the wheel 20, and is capable of retaining in memory the ascending movements during those periods when transmission of such movements may be prevented owing to the obstruction of the wheel 30.

The transfer wheel 20 engages with a cog 31 formed along the circumference of a free wheel 33 the hub of which may be locked by a control means or drive provided for this purpose and shown on the diagram as 35. When this drive is in operation, the wheel 20 is obstructed on the descending movement through the cog 31, while this wheel remains always free in the ascending movement.

A single means of positive transmission of the rising movements is provided from the wheel 30 towards the output or recording wheel 40, and this transmission is formed by thrust levers 34 and 43 respectively, with thrust bearing surfaces 34M and 43M. Furthermore, the wheel 30 carries an auxiliary thrust lever 36 made to engage the push contact 42 of a micro-switch 41 carried by the wheel 40, when the thrust bearing surfaces 34M—43M are in engagement.

The wheel 40 engages with a cog 44 keyed on the input wheel 45 of a recording device 46 arranged to come into operation at predetermined intervals, for instance, every ten minutes, under the influence of a chronometric device shown on the diagram as 47. In the example under consideration recording is done by printing or perforating the value expressed in decimals or binary decimals and in the known way, from a coder comprising a "U" roller for the units, a "D" roller for the tens, and a "C" roller for the hundreds; as such a coder in the drawings can cover up to one thousand units (although it could moreover include ten thousands etc.) the values recorded will be those between 000 and 999. The "U" roller of the units which is keyed on to the entrance shaft 45, must make a complete revolution to effect a variation of ten units, and there will be a ratio of 100/1 in consequence, between wheels 40 and 44 if it is assumed that the wheel 40 (and thus the wheels 30, 20 and 10) are adapted to make one revolution for the thousand units representing the maximum figure likely to be reached by the value of the variable introduced at 1. Transmission from the wheel 40 to the cog 44 can of course be effected by gearing to one or several intermediate cog wheels.

The wheel 40 is likewise engaged through the medium of a cog 48 and a centrifugal clutch 49 with an electric motor 50 adapted to drive in the descending direction. This motor is connected in an electric circuit to an electric current supply 51 by means of a contact 52 open when at rest, of a relay 53. This relay is disposed so that it may be switched on by means of an impulse from the recording device 46 through a line 54, and it comprises a driven holding circuit operated by another contact 55 and which is normally open.

The method of operation of the apparatus will now be described with reference to FIGURE 2 which is a graphical representation with the abscissa representing time of the application of the variable at the input and shown as the ordinate. The times $t_1$, $t_2$, $t_3$ etc. are those when, every ten minutes for instance, the chronometric device 47 releases an operating cycle of the coder 46. This command to record causes the coding rollers U, D, C to be blocked, and a printing or perforating operation to be set up of their respective positions. Blocking of the free wheel 33 is ensured at the same time as that of the rollers U, D and C. At successive time intervals shown by the references $x_2$, $x_3$ etc., the printing operation having been completed, the rollers U, D, C are released (but the cog 31 remains blocked), and an impulse then applied at the line 54 has the effect of energizing the relay 53 thereby closing the contactor 52 as well as the holding contact 55; motor 50 then starts, and as soon as it has reached a sufficient speed to engage the centrifugal clutch 49, it drives the wheel 40 through the medium of the cog wheel 48 in a descending movement, this wheel 40 being generally at an ascended position above the wheel 30 as will be explained, that is to say its lever 43 is disconnected from the lever 34 and is ascended in relation to the latter to some extent. The descending movement brought about by the motor 50 continues until the lever 43 re-engages the lever 34; the lever 36 then operates the micro-switch 41, cuts off the current supply from the relay, and the motor stops and the driving weight heads of the centrifugal clutch retracted by their leaf springs, free the cog wheel 48, and therefore the wheel 40, from its coupling with the motor 50. At succeeding instants $C_2$, $C_3$ etc., which are separated from the prior instants $x$ by time intervals which will provide adequate time for the descending lever 43 to contact the lever 34, even if, in exceptional circumstances, the lever 43 would have to leave the highest position in pursuit of the lever 34 which has returned to the zero position, the drive 35 causes the hub of the free wheel 33 to be released; as a result, the wheel 20 is thenceforth free to undertake descending movements which may be transmitted to it through the memory spring 11.

Figure 2:
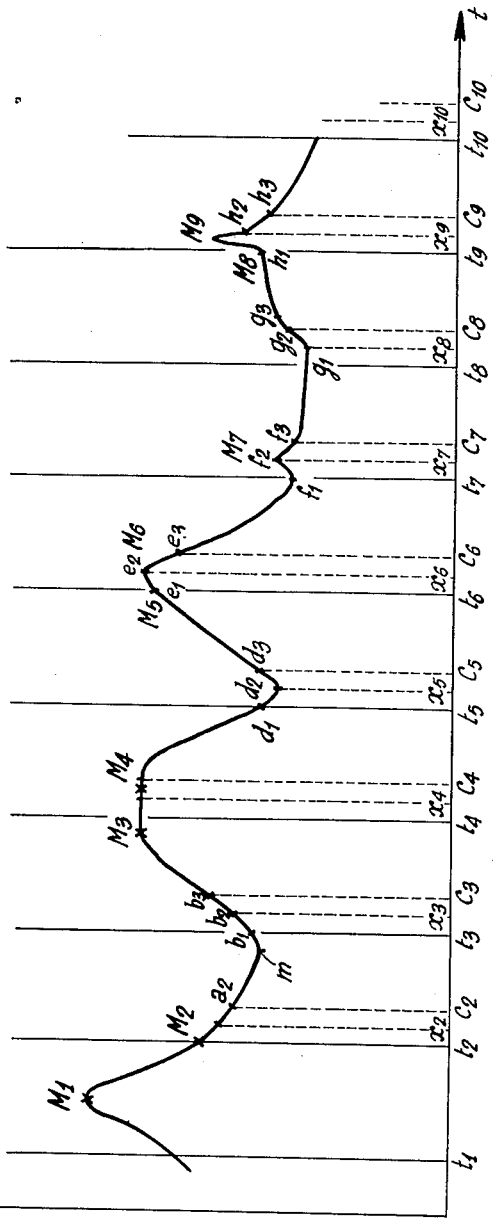
FIGURE 2 is an explanatory diagram showing in detail the development of the variable under test over a number of predetermined testing periods.

If, at that moment, the value of the variable applied at the input wheel undertakes the development shown by curve of FIGURE 2, beginning with the ascending portion of the curve which follows the moment $t_1$, the corresponding ascending movement of the input wheel 10 is transmitted through the levers 12—21 to the wheel 20, and thence through the spring 22, to the wheel 30 and through the levers 34—43 to the wheel 40. After passing the maximum M1 the input wheel returns on its descending path carrying with it the wheel 20 through the spring 11, the movement of the wheel being positively transmitted by 23—32 to the wheel 30; then the lever 34 of the latter disengages from the lever 43 of the wheel 40 which is thus left in its position corresponding to maximum M1 of the curve. The three wheels 10, 20, 30 pursue freely their descending movement together to position M2 at the moment $t_2$ when, as has been seen, the printing cycle is renewed, blocking the coding rollers on the one hand and the free wheel on the other. The variable value recorded, determined by the position of the wheel 40, corresponds thus to the ordinate of the maximum M1 attained by the variable in the interval $t_1$—$t_2$.

During printing (interval $t_2$—$x_2$) the wheel 10 continues its descending movement, while the wheel 20 is blocked on the descending movement of the free wheel 33; the descending movement not transmitted from the wheel 10 to the wheel 20 is stored up by the memory spring 11. At the moment $x_2$, recording having been finished and the coding rollers released, the relay 53 closes and the motor 50 drives the wheel 40 in pursuit of the wheel 30. As the latter is blocked by the wheel 20 in the starting position M2 of the new sampling period ($t_2$—$t_3$) already under way, it causes the wheel 40 to stop in the corresponding position which it has consequently maintained in memory. At the moment $C_2$ the wheel 20 is released and the descending movement M2—$a_2$ effected from $t_2$ by the wheel 10, is then restored to it by the memory spring 11 which brings with it the lever 21 in contact with the lever 12, as it unwinds, after having disconnected the lever 34 from the lever 43. The wheels 20 and 30 thenceforth freely follow the input wheel 10 in a descending movement down to the minimum $m$, location a little in advance of the moment $t_3$ and thereafter in the ascending period rising from the minimum $m$. At the moment $t_3$ a new recording cycle starts, the wheel 40, being left in the position M2, the ordinate value thereof is what is recorded and this is still again the maximum of the value of the variable in the sampling period $t_2$—$t_3$ which has just been considered.

Over the following period an increase in the value of the variable ensues from the initial level $b_1$ up to the level M3, and then it becomes constant in the neighbourhood of this level.

The wheel 20 does not relinquish its pursuit of this movement since it is blocked by the free wheel only in the descending direction. This movement is freely transmitted to the wheel 30 the lever 34 of which is detached from behind the lever 43 of the wheel 40. After moment $x_3$ at the end of recording, when level $b_2$ is still below M2, the wheel 40 starts its descending movement until it engages the wheel 30 this being effected at a certain level between $b_2$ and $b_3$; thenceforth, the wheel 40 is driven in the general ascending movement and all the wheels are together at the moment $t_4$ when the recording cycle ends at the end of the period $t_3$—$t_4$ i.e. after the maximum value M3 has been reached.

At the beginning of the following period, as the value of the variable remains constant, nothing moves during the recording (until $x_4$) nor during the interval $x_4$—$C_4$; the wheels 30—40 remaining together in effect, the micro-switch 41 remains cut off and at the moment $C_4$ the relay is not closed.

At the moment $t_5$ when the variable value has fallen to $d_1$ and continues to descend, there is a recording of the variable value M4 equal to M3, where the wheel 40 has been left in the meantime. The wheel 20 is blocked at $d_1$ and the spring 11 stretches up to $d_2$. Next however, while the wheel 40 redescends the spring 11 slackens once more, since the level of the curve rises and when the wheel 10 has engaged the wheel 20 the entire group of three wheels 10, 20 and 30 begins to rise to meet the wheel 40 which is about to resume its descending movement.

At moment $t_6$ the value continues to rise, and all wheels have followed up to M5 where the recording takes place which blocks 40 and 30. The memory spring 22 begins to act, and stores the ascending movement which was unable to be transmitted, and which is being pursued here up to M6. When at moment $x_6$ the coding rollers are released, it is no longer a descending movement of 40 which takes place but a further ascending movement of the wheel 30 under the influence of the slackening of the spring 22. After moment $x_6$ the curve returns downwards, and the free wheel 33 is still blocked, the spring 11 tightens, 20 and 30 return in contact with 10 (leaving 40 in M6) after releasing 33 in $c_6$.

At moment $t_7$ there is a recording of M6. The wheels 30 and 40 are not in contact, since the present value $f_1$ is lower. The restoration of the value brings the restoration of the wheels 10, 20, 30 up to M7. Since the curve next resumes its descending movement, 20 is blocked at M7 by the free wheel and will be brought back into contact with wheel 10 after releasing the said free wheel at the moment $c_7$; the wheel 40 descends to M7 and remains at that position.

At the moment $t_8$ there is a recording of M7. Between $g_1$ and $g_2$ nothing transpires, since the curve is horizontal. Between $g_2$ and $g_3$ the three first wheels ascend again following the curve; engagement of 30 with 40 will take place between $g_2$ and $g_3$.

At the moment $t_9$ the corresponding point $h_1$ of the curve is the maximum M8 of the preceding time period of ten minutes. At that moment all wheels are in contact and are blocked by 40 on the ascending movement. The spring 22 stretches up to maximum M9 which takes place between $t_9$ and $x_9$.

As the curve next re-descends, before moment $x_9$ when the rollers are released, and 20 is blocked on the descent of free wheel 33, this descending movement is stored in memory by the spring 11. After the moment $x_9$ when the rollers are released, the wheel 40 having maintained contact with wheel 30, the catch of spring 22 restores the position corresponding to M9 to the whole of the wheel group 30 and 40. Further, after moment $c_9$ when the free wheel is released, the catch of 11 brings back the two wheels 20 and 30 into contact with the wheel 10.

It may thus be apparent that in every form of operation considered, the apparatus records correctly, at the end of each testing period, the maximum value attained during that period by the variable applied at the input. What has just been observed for different circumstances may occur with a continuously variable curve, and must of necessity still apply for a discontinuous curve for example in laps.

The moments C when the free wheel is released, as has been seen, occur at the ends of specific times corresponding to the maximum descent of 999 units of the wheel 40. This release may be electrically controlled, at the instant the wheel 30 is engaged by 40, when the micro-switch 41 starts to act. Nevertheless it would be necessary to ensure that the blocking is maintained during the time the recording e.g. perforation takes place in cases where the wheels 30—40 remain in engagement and when in consequence the micro-switch remains disconnected during the recording; it seems finally that this improvement to meet circumstances which are too hypothetical in character, would however tend to involve complications.

The centrifugal clutch 49 is a modification in the absence of which the motor torque applied to the input shaft 1 of the apparatus ought to be sufficient to drive the rotor of motor 50 without source of energy, and the memory spring 11 ought to be fitted in consequence.

Figure 3:
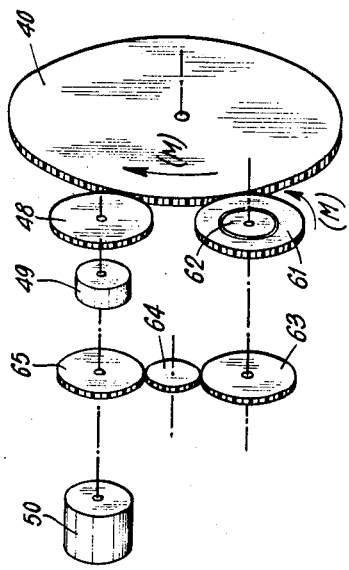
FIGURE 3 is a perspective diagrammatic view of another recording apparatus.

In order to avoid the wheel 40 being fitted so as to rub slightly on its axle which could entail the necessity for making adjustments in course of time, the apparatus shown in FIGURE 3 may be employed. In FIGURE 3 the wheel 40 engages with a cog wheel 61 of a free wheel 62 which is coupled to the motor shaft 50 by means of gearing 63—64—65. The arrow M shows the direction in which the free wheel 62 is disengaged.

As during recording the motor 50 is cut off, the free wheel allows the wheel 40 to ascend freely, while if the latter were to re-descend it would be necessary for it to drive the motor-rotor which is in itself a sufficient brake. When the motor 50 is fed in order to cause the wheel 40 to re-descend, it drives the hub of the free wheel which in no way interferes with the descending movement of the wheel 40.

As mentioned herein above, a particularly important application of the invention is the recording of maximum and movable average of a force P for example. Such a movable average is expressed by:

$$\int_0^t P(t)\,dt - \int_0^{t-T} P(b)\,dt = \int_{t-T}^t P(t)\,dt$$

and may be obtained by means of systems known per se comprising delaying lines, magnetic bands or other similar expedients enabling a comparison to be made of the integral of the maximum value of P considered (power for example) from the original moment up to the moment $t$, at the value which this integral had at the moment $(t-T)$. The amount of the integral, as determined by an integrating counter, may be transmitted for instance directly to one of the inputs of a mechanical differential and with the fixed delay T at the other input of this differential. The input shaft of the latter may be regarded then as the input shaft 1 of the recording apparatus such as described with reference to FIGURE 1. The fixed delay T may for example be ten minutes and equivalent to the duration of the testing period between the moments of recording $t_1$, $t_2$, $t_3$, etc. (FIGURE 2). This duration of the testing periods of the apparatus described, may however be given any desired values and even variable ones if desired, in terms of possible other parameters; in order to fix these sampling periods it is sufficient of course to use in consequence the chronometric device 47 which controls the recording operations.

The motor torque necessary to ensure the drive of the input wheel 10 of a recording apparatus may be excessive for many recording devices; to enable this drive to be carried out even in cases where the available torque is only very low at the output of the recording apparatus, the servomotor mechanism shown in FIGURE 4 or 5 may be employed.

This servo-motor drives the input shaft 1 of FIGURE 1 which is driven in one or the other of the two directions of rotation and this servo-motor is responsive to a device for detecting the angular movement between two reference points which are respectively connected to the driven shaft 1 forming the input to the recording apparatus on the one hand, and on the other hand to the driving shaft 3 (FIGURE 1) forming the output of the recording apparatus.

The necessary energy for driving the input of the recording apparatus being borrowed under these circumstances from an outside source, the driving shaft 3 may be disconnected from all resistant torque likely to affect the efficient operation of the measuring apparatus.

Referring to FIGURE 4 a driven shaft 71 corresponds to the input shaft 1 of FIGURE 1 and the driving shaft 72 is connected to the recording apparatus 46 (FIGURE 1). A toothed wheel 73 is keyed on the shaft 72 and meshes with a cog 74 the axle 75 of which is rotatable in a commutator switch body 76 carried on an arm 77, fixed on the end of the driven shaft 71. The axle 75 carries on the inside of the body 76 a rotor arm 78 which moves over two sectors 81, 82, arranged on both sides of a stud 80 the two shafts 71, 72 coinciding when the rotor arm 78 is opposite the stud 80.

The driven shaft 71 includes three electro-magnetic clutches 84, 85, 86, the energizing circuits of the coils of which are fed from an outside current source through sliding contacts 87 and 88 under the control of the switch 76. As seen in FIGURE 4 the contact 88 is permanently connected to one of the terminals of each of these circuits, while the other contact 87 is connected by a flexible wire 89 to the arm 78; wires 91, 92, 93 from the second terminal of the energizing circuits of the coils of the clutches 84, 85, 86, are connected respectively to the stud 80 and to the two conductor sectors 81 and 82. When energized the clutch 84 ensures the coupling of the driven shaft 71 to a fixed disc 95, while energization of the clutches 85 and 86 has the effect of coupling the driven shaft 71 on to one or other of two wheels 96, 97 which are driven in opposite directions of rotation by a cog 98 connected to a permanently rotating electric motor 99.

When the driving shaft 72 rotates for example in a clockwise direction, the arm 78 makes contact with the sector 81 which causes energization of the clutch 86; the shaft 71 is then set in rotation in the same direction as the shaft 72 and when the latter stops, the arm 78 is located in contact with the contact 80 and controls the blocking of the shaft 71 by the clutch 84 on the disc 95. The speed of the motor 99 must be adjusted according to the possible speed of the driving shaft; the accuracy with which the shaft 72 overtakes the shaft 71, is the effect of the characteristics of the detector device as constituted by the switch 76 and particularly the ratio of gear wheels 73 and 74 and the diameter of the sectors 81 and 82.

In cases where the variations of the speed of the driving shaft are too great, a relatively high speed of the wheel 98 may be used and the sectors 81 and sections a, b, c, d, may be split up in such a way as to energize the clutches 85, 86 to a greater or lesser extent by the action of resistances A, B, C, according to whether the arm 78 is more or less inclined to move from its balanced position opposite the stud 80.

In another variation, the motor 99 and the clutches 85 and 90 may be replaced by a motor with two directions of rotation, the two sectors 81, 82 serving to select the direction. The clutch device as represented in FIGURE 4 however, offers the advantage of much quicker response and elimination of the effects of motor inertia when the two shafts again coincide.

FIGURE 5 shows another construction of angular movement detecting device which may be used in cases where the available torque in the driving shaft 72 is very low. According to this embodiment, the wheel 73 of FIGURE 4 is replaced by a disc 101, which has a radial slit 102 and an arcuate slit 103 in the form of a sector extending over an arc of 120° as shown for example.

An optical system 105, mounted on the driven shaft 71, comprises at one side of the disc 101 and around the driving shaft 72, a transmitter 106 formed, on the inside of a toroidal casing, by three light sources adapted to transmit through slits 107, 108 and 109 beams of coloured light 111, 112, 113 directed on to three light sensitive devices such as photo-diodes 114, 115, 116 respectively and disposed in a part 117 of the optical system mounted on the end of the shaft 71. The photo-diodes 114, 115, 116 are adapted to energize the clutches 84, 85, 86 by means of the lines 118, 119, 120 as shown in FIGURE 4.

At the position at which the two shafts 71 and 72 coincide, the slit 102 is in the path of the beam 111, whilst the sector 103 has stopped between the beams 112 and 113: the photo-diode 114 being energized causes the driven shaft 71 to be blocked. On the rotation of the driving shaft 72, the beam 111 is interrupted by the removal of the slit 102 while the sector 103 uncovers one or other of the two beams 112 and 113 following the direction of rotation and the corresponding photo-diode 115 or 116, brings about the drive of the shaft 71 in the desired direction.

What I claim is:

1. A recording apparatus for recording maximum values of a variable occurring over a predetermined testing period, said apparatus comprising an input wheel capable at any given time of angular movement proportional to the value of the variable under test, a transfer wheel, a connecting wheel, an output wheel, a first spring for transmitting movement of the input wheel to the transfer wheel and capable of storing in memory descending movements of the transfer wheel, a second spring for transmitting movement of the transfer wheel to the connecting wheel and capable of storing in memory ascending movement of the transfer wheel, a first positive transmission means in parallel with said first spring to transmit ascending movements to the transfer wheel from the input wheel, a second positive transmitting means in parallel with said second spring to transmit descending movements to the connecting wheel from the transfer wheel, a third positive transmission means for transmitting to the output wheel ascending movement of the connecting wheel, means for recording the position of the output wheel at predetermined time intervals, unidirectional means to block descending movements of the transfer wheel during each recording, and means to drive the output wheel in a descending direction after each recording until said third positive transmission means re-establishes a connection between said output and connecting wheels, if such connection was previously interrupted.

2. An apparatus according to claim 1 wherein the blocking means comprises a free wheel coupled to the transfer wheel.

3. An apparatus according to claim 1 wherein the means for driving the output wheel in the descending direction comprises an electric motor, an electric circuit controlling said motor, and coupling means for coupling said motor to the output wheel.

4. An apparatus according to claim 1 wherein the means for driving the output wheel in the descending direction comprises an electric motor, coupling means for coupling said motor to said output wheel, and a control circuit controlling said motor and incorporating a relay responsive to an impulse from said recording device to close and to remain closed until said output wheel re-engages said connecting wheel.

5. An apparatus according to claim 1 wherein said means for driving the output wheel includes a centrifugal clutch.

6. A recording apparatus for recording maximum values of a variable occurring over a predetermined testing period, said apparatus comprising an input wheel capable at any given time of angular movement proportional to the value of the variable under test, a transfer wheel, a connecting wheel, an output wheel, a first spring for transmitting movement of the input wheel to the transfer wheel and capable of storing in memory descending movements of the transfer wheel, a second spring for transmitting movement of the transfer wheel to the connecting wheel and capable of storing in memory ascending movement of the transfer wheel, a first positive transmission means in parallel with said first spring to transmit ascending movements to the transfer wheel from the input wheel, a second positive transmitting means in parallel with said second spring to transmit descending movements to the connecting wheel from the transfer wheel, a third positive transmission means for transmitting to the output wheel ascending movement of the connecting wheel, means for recording the position of the output wheel at predetermined time intervals, unidirectional means to block descending movements of the transfer wheel during each recording, motor means to drive the output wheel in a descending direction after each recording until said third positive transmission means re-establishes a connection between said output and connecting wheels, if such connection was previously interrupted and a means for braking the output wheel driven by the motor means.

7. An apparatus according to claim 6 wherein the braking means comprises a second coupling driving the output wheel in the descending direction, and a free wheel included in said second coupling.

8. A recording apparatus according to claim 6, further comprising an angular movement detecting device capable of detecting angular movement between two reference points, said detecting device having an input wheel shaft operatively connected to said input wheel and an output wheel shaft operatively connected to said output wheel, and a servo-motor drivingly connected to said input wheel shaft and responsive to said detecting device.

9. A recording apparatus according to claim 8 wherein three electro-magnetic clutches are coupled to said input wheel shaft, one of said clutches being operable to connect said input wheel shaft to a stationary brake member and said other two clutches being operable in a reverse direction to the first clutch and driven by a stationary motor, the energizing electric circuits of said three clutches being responsive to said detector device.

10. A recording apparatus according to claim 8 wherein three electro-magnetic clutches are coupled to said input wheel shaft, one of said clutches being operable to connect said input wheel shaft to a stationary brake member and said other two clutches being operable in a reverse direction to the first clutch and driven by a stationary motor, the energizing electric circuits of said three clutches being responsive to said detector device, said detector device comprising a rotary switch the body of which is operatively connected to said output wheel shaft and has angularly spaced electric contacts, and the rotor arm of said switch is operatively connected to said input wheel shaft.

11. A recording apparatus according to claim 8 wherein said detector device comprises a disc driven by said output wheel shaft, a radial slit in said disc, an arcuate slit of predetermined length in said disc, and an optical system driven by said output wheel shaft and coaxial with said disc, said optical system having three light beam transmitting means disposed on one side of said disc directing said beams towards said disc and three light sensitive devices on the other side of said disc disposed one in the path of each said light beam whereby said radial slit permits a first of said light beams to pass when said shafts coincide and said arcuate slit permits one or other of said other two light beams to pass according to the direction of angular displacement of one said shaft with respect to the other said shaft.

12. A registering apparatus for registering the maximum value of a varying mean of a force, said apparatus comprising a differential device the angular position of the output shaft of which is representative of said mean of said force, an input wheel of a recording apparatus, and a train of gears coupling said differential output shaft to said last named input wheel, said recording apparatus comprising said input wheel, a transfer wheel, a connecting wheel and a recording apparatus output wheel, a first spring for transmitting movement of said input wheel to the transfer wheel and capable of storing descending movements of said transfer wheel, a second spring for transmitting movement of said transfer wheel to said connecting wheel and capable of storing ascending movement of said transfer wheel, a first positive transmitting means in parallel with said first spring to transmit ascending movements to the transfer wheel from said recording apparatus input wheel, a second positive transmitting means in parallel with said second spring to transmit descending movements to said connecting wheel from said transfer wheel, a third positive transmitting means for transmitting to the recording apparatus output wheel ascending movements of the connecting wheel, means for recording the position of said last named output wheel at predetermined intervals, unidirectional means to block descending movements of said transfer wheel during each recording, and means to drive said last named output wheel in a descending direction after each recording until said third positive transmission means re-establishes a connection between said last-named output wheel and said connecting wheel, if such connection was previously interrupted.

13. A recording apparatus for recording maximum values of a variable occurring over a predetermined testing period, said apparatus comprising, in combination:
 (a) an input wheel capable of angular movement proportional to the value of the variable under test;
 (b) a transfer wheel;
 (c) a connecting wheel;
 (d) an output wheel;
 (e) first positive transmission means interconnecting said input and transfer wheels for transmitting to the latter a movement of said input wheel in one direction which is representative of an ascending value of said variable;
 (f) first resilient lost-motion transmission means interconnecting said input and transfer wheels for transmitting from said input wheel to said transfer wheel a movement in the opposite direction which is representative of a descending value of said variable at said input wheel;
 (g) second positive transmission means interconnecting said transfer and connecting wheels for transmitting to the latter a movement of said transfer wheel in said other direction;
 (h) second resilient lost-motion transmission means interconnecting said transfer and connecting wheels for transmitting from said transfer wheel to said connecting wheel a movement in said one direction;
(i) third positive transmission means interconnecting said connecting and output wheels for transmitting to the latter a movement of said connecting wheel in said one direction;
(j) means for recording the position of said output wheel at predetermined time intervals; and
(k) means operable after each recording for driving said output wheel in said other direction until said third positive transmission means re-establishes a connection between said output and connecting wheels, if such connection was previously interrupted.

14. A recording apparatus as defined in claim 13 wherein each of said positive transmission means comprises a pair of cooperating stops arranged, respectively, on the two wheels which the particular transmission means interconnects.

15. A recording apparatus as defined in claim 14, further comprising means operable during recording for simultaneously blocking movement of said output and transfer wheels.

16. A recording apparatus as defined in claim 15 wherein said blocking means block movement of said transfer wheel in said other direction only.

References Cited in the file of this patent
UNITED STATES PATENTS
2,957,743    Terry _____ Oct. 25, 1960